United States Patent Office 3,425,831
Patented Feb. 4, 1969

3,425,831
STENCIL SCREEN
Dan A. Poole, Lancaster, Ohio, assignor to Anchor Hocking Glass Corporation, Lancaster, Ohio, a corporation of Delaware
No Drawing. Filed Jan. 12, 1965, Ser. No. 425,073
U.S. Cl. 96—36.4          7 Claims
Int. Cl. G03c 5/40

ABSTRACT OF THE DISCLOSURE

A method of forming a design on a stencil screen for decorating molded ceramic or glass articles at elevated temperatures comprising the application of a single coating of a soluble, light hardenable material including an aqueous dispersion of polytetrafluoroethylene. The coating is applied to the screen and exposed to light in the desired stencil pattern thereby hardening the exposed portion. The unhardened and unexposed portions of the coating are then removed by washing or the like, and the remaining light hardened portion is heated to further harden and cure the polytetrafluoroethylene.

---

The present invention relates to an improved stenciling screen and in particular to an improved stenciling screen for use at elevated temperatures and to the method of forming the screen.

Stencils or screens have wide application in the decoration of articles and a typical and important use for a screen made in accordance with the present invention is in the decoration of molded ceramic or glass articles where the decorating materials are applied to articles at elevated temperatures. The use of screens in applying decorative designs or labels to articles such as glasswares is well-known and in the commonly used decorating methods now employed it is necessary to provide a cooling period between the article forming step and the decorating step. The cooling is required since conventional decorating screens are otherwise damaged by contact with glassware which is at an elevated temperature after formation. Under the known systems additional article handling equipment and an additional time delay are required to provide the necessary cooling to lower the temperature of the molded articles subsequent to their being stenciled.

Decorating or stenciling screens are made with a metal support consisting of a screen or mesh formed of a corrosion resistant metal such as stainless steel. Such screens are normally used in a mesh size of from 100 x 100 to 250 x 250 depending upon the fineness and detail of the design being applied. The design outline is formed on the metal screens at present by applying a coating to the screen to form imperforate areas in accordance with the desired design.

In order to provide a heat-resistant screen of this type it has been proposed that the applied material be polytetrafluoroethylene resin such as is available in aqueous dispersion under the trade-name "Teflon" from E. I. duPont de Nemours & Company of Wilmington, Delaware. One method of using Teflon has been proposed wherein a negative or reverse image of the design is first formed on the screen using a soluable light hardened material. The unexposed or unhardened area is removed and filled with the Teflon coating. The Teflon is cured and the exposed area of the light hardened material is then dissolved by a suitable solvent. This method is described in United States Patent No. 2,860,576. The method of the present invention provides an improvement upon this method by providing for the direct formation of the Teflon coating in the form of the final desired design on the wire mesh screen. This direct application of the decorative design in heat-resisting form provides a screen giving greater design detail and capable of being more rapidly formed. A stenciling screen manufactured by the below described method is capable of operation for extended periods at temperatures as high as 600° F. and with the decoration being applied to molded articles within 3 to 15 minutes from their leaving the forming mold depending on the thickness of the molded article.

Accordingly, an object of the present invention is to provide an improved high temperature stenciling screen and an improved method of producing such a screen.

Another object of the present invention is to provide a high temperature stenciling screen capable of embodying greater design detail.

Another object of the present invention is to provide a more easily and more quickly manufactured stenciling screen for use at high temperatures.

Another object of the present invention is to provide an improved method of forming a high temperature stencil including an electrical curing step.

Other and further objects of the invention will be obvious upon an understanding of the illustrative embodiment about to be described or will be indicated in the appended claims, and various advantages not referred to herein will occur to one skilled in the art upon employment of the invention in practice.

In general the method of forming a stenciling screen in accordance with the present invention comprises first applying a light sensitive emulsion to the wire mesh with heat-resistant Teflon included in the emulsion. This coating is then exposed to a light image directed onto the coated screen in the form of the decorative design desired thereby hardening that portion of the coating. The exposed screen is now developed thereby removing the unexposed portions and leaving a design in the form of the exposed portion which was hardened by its exposure to light. After drying the remaining coating in the form of the design is cured to harden the Teflon and to form the heat-resistant and imperforate design on the screen.

In forming the light sensitive coating light sensitizing agents are used which are compatible with the Teflon. The following examples describe materials suitable for the purpose.

Example I

A screen comprising a stainless steel wire mesh with a mesh size of 165 x 165 is mounted on a suitable heat-resistant frame such as an aluminum frame or stainless steel. The mesh is given an imperforate coating by dipping or spraying with the photo-sensitive or light hardened emulsion consisting of the following:

(1) 6 oz. polyvinyl alcohol
(2) 2 oz. polyvinyl acetate
(3) 20 oz. 60% acqueous dispersion of polytetrafluoroethylene (Teflon)
(4) 6 oz. ammonium dichromate A suitable polyvinyl acetate is Elvacet Grade 81–900 and a suitable Teflon is Type 852–207 both available from E. I. du Pont de Nemours & Company, Wilmington Delaware.

This emulsion is now dried at an effective drying temperature in the neighborhood of 90° F. and in darkness to preserve the photo-sensitive properties of the coating.

The dried screen is now exposed to a light source in a conventional photographic printer with the exposure time being adjusted in direct proportion to the amount of Teflon used in the emulsion. An exposure time of about 5 minutes being satisfactory with the above emulsion. A portion of the coating is exposed to the light and hardened while the remainder of the coating forming the design remains water soluble. The exposed screen is thereafter developed using warm water at a temperature not over 90° F. with the water being applied to the surface of the exposed screen as a light stream. At the completion of the development and when the unexposed coating has been removed to form the stencil apertures the screen is then cleaned by a light blast of air.

The screen is cured in a kiln or oven where the temperature is held at about 750° F. for a period of about 2 minutes. The resulting screen is ready for use in decorating at elevated temperatures with a heat-resistant coating formed thereon incorporating the desired design. As indicated above this screen is used advantageously in ceramic decoration and molten ceramic decorating color may be applied through the screen by wiping or spraying for extended periods.

Example II

A screen generally similar to that described in Example I is coated with a similar emulsion except that the proportion of Teflon is reduced to 10 oz. to provide for a stencil having increased detail in the design thereby requiring more detail to be defined by the stencil apertures. The emulsion is dried and exposed to a light source to form the stencil outline in the manner described above and the unexposed portions which define the stencil apertures are similarly removed by a warm water developing operation.

The curing or hardening of the Teflon for the imperforate portion of the stencil, however, is done by an electrical process which is particularly useful for stencils including fine details of design as the electrical methods permit an accurate control of the curing and a continuous and close observation of the stencil throughout the heating process. In addition the electrical heating is particularly advantageous as the heat generated is localized immediately adjacent to the wires of the mesh or screen and thus the curing heat is efficiently applied to the Teflon coating without excessively heating or damaging other portions of the stencil. A stencil prepared for this type of curing using an electrical current preferably has the screen insulated from the frame and may also advantageously use a screen formed of insulated wire.

The heating is accomplished by placing spaced portions of the mesh screen in circuit with a low voltage high current source of electric power where the current may be precisely controlled to limit its heating effect and where careful observation of the wire and the Teflon being cured permits the current value to be set to raise the temperature of the Teflon coating to approximately 750° F. for the necessary 1 to 3 minute period.

It will be seen that an improved stenciling screen and method of manufacturing the screen have been provided. The method itself which is relatively simple and easily accomplished provides a stencil capable of extremely fine decorative work and which is useful at elevated temperatures. The screen thus may be used in a decorating process which differs from that normally employed by being performed on extremely hot articles such as glassware shortly after the glassware has left the forming mold and where only an extremely short cooling interval is required to lower glass temperature to the range of about 600° F. The method of the invention provides these improved results and comprise a series of steps which are uncomplicated and relatively few in number. A novel curing step has also been provided using an electrical heat operation.

As various changes may be made in the steps of the method described herein without departing from the spirit and scope of the invention and without sacrificing any of its advantages, it is to be understood that all matter herein is to be interpreted as illustrative and not in a limiting sense.

Having thus described my invention, I claim:

1. A method of forming a design on a stencil screen which comprises the steps of coating the screen with a water soluble light hardenable material including an aqueous dispersion of polytetrafluoroethylene, exposing the coating to light in the desired pattern and hardening the exposed portion, removing the unhardened and unexposed portions of the coating, and heating the coating and sintering the polytetrafluoroethylene.

2. A method of forming a design on a stencil screen which comprises the steps of coating the screen with a water soluble light hardenable material including an aqueous dispersion of polytetrafluoroethylene, exposing the coating to light in the desired pattern, washing the screen and removing unhardened and unexposed portions of the coating, and heating the coating and sintering the polytetrafluoroethylene.

3. A method of forming a design on a metallic stencil screen which comprises the steps of coating the screen with a water soluble light hardenable material including an aqueous dispersion of polytetrafluoroethylene, exposing the coating to light in the desired pattern, dissolving the unhardened and unexposed portions of the coating, and passing an electric current through the metallic screen thereby heating the coating and sintering the polytetrafluoroethylene.

4. A method of forming a design on a stencil screen which comprises the steps of coating the screen with an imperforate coating of a water soluble light and heat hardenable material including 40 to 60% solid acqueous dispersion of polytetrafluoroethylene, exposing a portion of said coating to light and hardening it, dissolving the unhardened portions of the coating, and thereafter heating the coating thereby sintering the polytetrafluoroethylene.

5. A method of forming a design on a metallic stencil screen which comprises the steps of coating the screen with an imperforate coating of a water soluble light and heat hardenable material including a 40 to 60% solid acqueous dispersion of polytetrafluoroethylene, exposing a portion of said coating to light and hardening it, dissolving the unhardened portions of the coating, and thereafter passing an electric current through said screen heating the coating and thereby sintering the polytetrafluoroethylene.

6. A method of forming a design on a stencil screen which comprises the steps of coating the screen with an imperforate coating of a water soluble light and heat hardenable material consisting by weight of about 6 parts of polyvinyl alcohol, about 6 parts of acetate, about 2 parts of polyvinyl acetate, 1 to 20 parts of a 40 to 60% solid acqueous dispersion of polytetrafluoroethylene, and about 6 parts of ammonium dichromate, exposing a portion of said coating to light and hardening it, dissolving the unhardened portions of the coating, and thereafter heating the coating thereby sintering the polytetrafluoroethylene.

7. A method of forming a design on a metallic stencil screen which comprises the steps of coating the screen with an imperforate coating of a water soluble light and heat hardenable material consisting by weight of about 6 parts of polyvinyl alcohol, about 6 parts of acetate, about 2 parts of polyvinyl acetate, 1 to 20 parts of a 60% solid acqueous dispersion of polytetrafluoroethylene, and about 6 parts of ammonium dichromate, exposing a portion of said coating to light and hardening it, dissolving the unhardened portions of the coating, and thereafter passing an electric current through said screen and heating the coating thereby sintering the polytetrafluoroethylene.

(References on following page)

References Cited

UNITED STATES PATENTS

| | | | |
|---|---|---|---|
| 2,731,347 | 1/1956 | Gray | 96—114 |
| 2,860,576 | 11/1958 | Short | 101—128.3 |
| 3,074,869 | 1/1963 | Workman | 101—128.3 X |

J. TRAVIS BROWN, *Primary Examiner.*

R. E. MARTIN, *Assistant Examiner.*

U.S. Cl. X.R.

101—128.3